(12) United States Patent
Sabatino

(10) Patent No.: US 7,129,832 B2
(45) Date of Patent: Oct. 31, 2006

(54) HIGH/LOW LEVEL ALARM CONTROLLER

(76) Inventor: Daniel Sabatino, 3 Carriage Dr., Burlington, CT (US) 06013

( * ) Notice: Subject to any disclaimer, the term of this patent is extended or adjusted under 35 U.S.C. 154(b) by 0 days.

(21) Appl. No.: 10/928,263

(22) Filed: Aug. 30, 2004

(65) Prior Publication Data

US 2005/0024217 A1    Feb. 3, 2005

Related U.S. Application Data

(63) Continuation-in-part of application No. 10/846,523, filed on May 17, 2004, now Pat. No. 6,970,079.

(60) Provisional application No. 60/470,333, filed on May 15, 2003.

(51) Int. Cl.
*G08B 29/00* (2006.01)
*G01F 23/30* (2006.01)

(52) U.S. Cl. .................. 340/511; 340/618; 340/984; 340/450; 73/290 R; 73/307; 137/386; 137/551; 137/558; 116/109

(58) Field of Classification Search ................ 340/511, 340/612

See application file for complete search history.

(56) References Cited

U.S. PATENT DOCUMENTS

| | | | | |
|---|---|---|---|---|
| 4,290,059 A | * | 9/1981 | Noyes et al. | 340/624 |
| 4,736,077 A | * | 4/1988 | Valente | 200/84 C |
| 4,837,552 A | * | 6/1989 | Vandemotter et al. | 340/461 |
| 5,534,849 A | * | 7/1996 | McDonald et al. | 340/517 |

* cited by examiner

*Primary Examiner*—Donnie L. Crosland
(74) *Attorney, Agent, or Firm*—Connolly Bove Lodge & Hutz LLP

(57) ABSTRACT

A high/low level alarm controller having ability to interface with level sensing equipment and instrumentation in a manner that isolates the controller from downstream components is presented. The controller accepts power, logic and transduced level inputs; output from the controller is available to drive relays, solenoid valves, motors, pumps, alarm horns, etc. The high/low level alarm controller is ideal for existing/retrofit applications and new installations alike.

36 Claims, 12 Drawing Sheets

HIGH/LOW LEVEL ALARM CONTROLLER

This application is a Continuation-in-Part of application Ser. No. 10/846,523, filed May 17, 2004, now U.S. Patent No. 6,970,079, published Nov. 29, 2005, which claims the benefit of U.S. Provisional Application No. 60/470,333, filed May 15, 2003.

FIELD OF THE INVENTION

The present invention relates generally to fluid level monitoring and, more particularly, to alarm indication and control of specified fluid level using a control system having adjustable set points.

BACKGROUND OF THE INVENTION

Indication of fluid or liquid level is a critical variable in process control, storage tank monitoring, and mechanical systems where liquids are contained. Level monitoring systems for liquids typically comprise a transducer to convert liquid level to an appropriate level indicating variable or signal, a transmission medium for conveying the variable or signal, a receiver to accept and process the variable or signal, and a display for visual indication. Liquid level indication is of particular importance in the marine industry. For example, when boats travel in the open sea, an accurate indication of fuel quantity is an essential component to successful navigation.

In addition to accurate indication of fuel quantity, it is also valuable to have an alarm mechanism that warns of dangerously low or high fluid levels. In the marine industry, warning of low fuel level is important so that marine craft operating personnel can timely plan a fueling station visit. Because fuel dispensing units at most marine fueling stations lack the same automatic shutoff capability that automobile fuel dispensers possess, the risk of fuel spillage from tank overfill is quite high. Fuel spillage contaminates the water and surrounding environment and presents a fire safety danger. Thus, alarm warning of high fuel level is important so that fuel pumping can be stopped to avoid fuel tank overfill.

Fuel level alarm systems are available but a common problem with traditional marine fluid level alarm systems is that source power is switch controlled by the ignition key. Other traditional alarm systems obtain power directly from ship instrumentation. These systems typically employ a timing circuit to shut off power after a predetermined time in order to prevent battery drain. By energizing the alarm system through the instrumentation, however, all on-board instrumentation will be energized since instrumentation is typically daisy-chain wired. Because marine craft fueling typically occurs while at dock, maintenance personnel are at often at work on marine craft systems while fueling occurs. With traditional alarm systems that require energizing the instrumentation to operate, such maintenance personnel are at risk to electrical shock since components may be unexpectedly energized.

Accordingly, what is needed is an alarm system that properly alarms for low-level but can also be safely used for high-level monitoring and control.

SUMMARY OF THE INVENTION

Aspects of the present invention include a liquid level sensor for sensing liquid level in a tank, comprising a liquid level sensing circuit; a magnetic switch coupled to an access tube associated with said tank, said magnetic switch being coupled to said liquid level sensing circuit; and a magnetic element arranged to engage said magnetic switch to control said liquid level sensing circuit.

Another aspect of the present invention includes an automatic high/low level alarm controller for monitoring a level, comprising a magnetic switch having first and second ends, said second end for receiving a reference voltage; an activator coupled to said magnetic switch; a trigger having first and second inputs and an output, said first input being coupled to said first end of said magnetic switch and said second input for receiving a source voltage; a relay having first and second inputs and an output, said first input being coupled to said second input of said trigger, said second input being coupled to said output of said trigger; and an alarm control unit coupled to said output of said relay, said alarm control unit being adapted to provide electrical output responsive to said level.

Another aspect of the present invention includes a method of using an automatic high/low level alarm controller, the method comprising moving an activator having an associated permanent magnet, wherein said moving causes a magnetic switch to change state and automatically arm a high/low level alarm controller; receiving a signal indicative of fluid level within a tank having a level sending unit that is electrically coupled to said high/low level alarm controller, said high/low level alarm controller generates an alarm condition when said fluid level reaches a predetermined level set point amongst at least one level set point; responsive to an occurrence of said alarm condition, acknowledging said alarm condition.

Another aspect of the present invention includes an alarm control unit for monitoring a variable condition, comprising a comparator having first and second inputs and an output, said first input for receiving a voltage that varies, said second input for receiving a set point voltage, said output capable of toggling between low and high impedance states relative to comparison of voltage at said first and second inputs; a voltage allocator having first and second inputs and an output, said output being coupled to said second input of said comparator, said first input for receiving a supply voltage, and said second input being coupled to said output of said comparator; a voltage divider having an input and first and second outputs, said input being coupled to said first input of said allocator and said first output being coupled to said second input of said allocator; a trigger having first and second inputs and an output, said first input being coupled to said first input of said allocator and said second input being coupled to said second output of said divider; and a relay having first and second inputs and an output, said first input being coupled to said first input of said allocator, said second input being coupled to said output of said trigger, and said output for driving an external network, wherein said voltage allocator is configured to establish an initial set point in response to receipt of said supply voltage and a subsequent voltage set point in response to said comparator relative to said variable voltage.

Another aspect of the present invention includes a marine craft comprising an automatic interlock controller and a power supply, said controller comprising at least one magnetic switch having a common first end and common second end, said second end for receiving a reference voltage; an activator coupled to said magnetic switch; a trigger having first and second inputs and an output, said first input being coupled to said first end of said magnetic switch and said second input for receiving a source voltage; and a relay having first and second inputs and an output, said first input being coupled to said output of said trigger, said second input being coupled to said second input of said trigger, said output for driving an external network.

Another aspect of the present invention includes a kit for outfitting a tank installation with an automatic high/low level alarm controller, the kit comprising a permanent magnet; a housing having at least one magnetic switch capable of magnetically coupling with said permanent magnet; and an alarm control unit electrically coupled to said at least one magnetic switch and adapted to provide electrical output responsive to level within said tank.

Another aspect of the present invention includes a high/low level alarm controller, comprising a selector switch; a relay; and an alarm control circuit, said alarm control circuit being adapted to provide electrical output responsive to level, wherein said selector switch and said relay form an isolation control unit.

Another aspect of the present invention includes a marine craft, comprising a power supply; a gauge coupled to said power supply; and an isolation control unit.

DETAILED DESCRIPTION

Disclosed is a high/low level alarm controller having ability to interface with level sensing equipment and instrumentation in a manner that isolates the controller from downstream components. The controller accepts power, logic and transduced level inputs; output from the controller is available to drive relays, solenoid valves, motors, pumps, alarm horns, etc.

Figure 1:
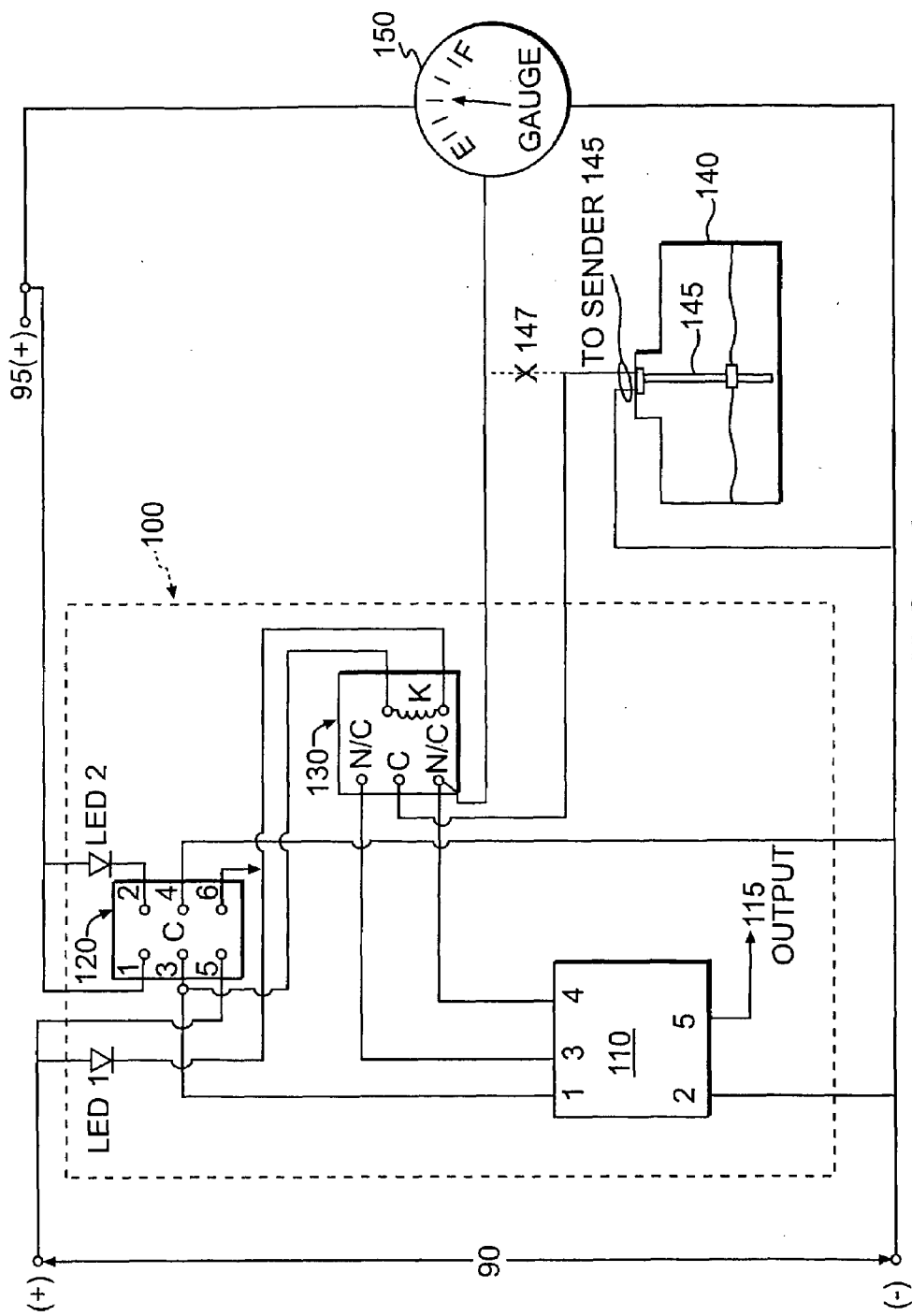
FIG. 1 illustrates a wiring diagram of an embodiment of a high/low level alarm controller.

FIG. 1 illustrates a wiring diagram of the high/low level alarm controller 100 configured in accordance with an embodiment of the present invention. Controller 100 provides three modes of operation: high-level monitoring mode, low-level monitoring mode, and disengaged, i.e., off. The embodiment illustrated in FIG. 1 discloses isolation of level sending unit 145 from level gauge 150 when controller 100 is in the high-level monitoring mode. Level gauge 150 can be analog or digital. Level sending unit 145 is installed within tank 140. In the high-level monitoring mode, sending unit 145 is powered by alarm control circuit 110, which obtains power independent of system instrumentation, such as gauge 150. Alarm control circuit 110 provides an intrinsically safe voltage to sending unit 145. With respect to voltage, an intrinsically safe voltage supply is characterized as a voltage source having high internal resistance with low output current, which is held constant. So configured, the power output of the source is held low such that when the supply terminal is grounded, output voltage falls to ground potential and no spark occurs. Thus, at light or no load (i.e., short circuit) conditions, the intrinsically safe voltage supply provides its lowest level of voltage. As load increases, the supply voltage increases proportionally and at the limit (i.e., open circuit condition) the supply voltage is at its maximum design level. Sending unit 145 is described in copending application Ser. No. 10/791,286, which was filed Mar. 3, 2004 by the inventor of the instant application and is incorporated by reference herein in its entirety.

Operating modes for controller 100 are established via selector switch 120. FIG. 1 illustrates selector switch 120 as a double-pole double-throw (DPDT) center off switch (i.e., a three position switch), but selector switch 120 can be of any multi-pole switch configuration to effectuate mode selection of controller 100. Operating modes could also be selected by using a plurality of single-pole switches. Selector switch 120 is illustrated in FIG. 1 as having six terminals for external connection. High-level monitoring mode is selected by toggling selector switch 120 such that terminal 3 is connected to terminal 5 and terminal 4 is connected to terminal 6. Low-level monitoring mode is selected by toggling selector switch 120 such that terminal 3 is connected to terminal 1 and terminal 4 is connected to terminal 2. The 'off' mode is selected by placing selector switch 120 in the center position.

Intermediate control of controller 100 is facilitated by relay 130. FIG. 1 illustrates relay 130 as a two contact (normally-open and normally-closed) relay with a common. Intermediate control of controller 100 can, however, be effectuated with a plurality of single contact relays or multiple contact relays. Further, FIG. 1 illustrates relay 130 as an electro-mechanical relay but relay 130 can also be a solid-state relay or the intermediate control can also be effectuated through use a transistor circuit configured to perform the function of relay 130. Selector switch 120 and relay 130 form an isolation control unit.

Alarm circuit 110 provides control logic to drive output 115 of controller 100. Alarm circuit 110 is illustrated in FIG. 1 as having five terminal connections. A detailed description of alarm circuit 110 is provided below.

High/low level alarm controller 100 utilizes two power connections: one power connection that couples to a steady source 90 and another power connection that couples to a switched or keyed source 95, such as might be available from an ignition key. Power source 90 connects to terminal 5 of selector switch 120 and the anode terminal of light emitting diode 1 (LED1). Power source 95 connects to terminal 1 of selector switch 120 and the anode terminal of light emitting diode 2 (LED2). The cathode of LED1 is connected to terminal 6 of selector switch 120 and a first end of coil K within relay 130. The cathode terminal of LED2 connects to terminal 2 of selector switch 120. Terminal 4 of selector switch 120 is connected to system ground; and terminal 3 of selector switch 120 is connected to a second end of coil K within relay 130, and terminal 1 of alarm circuit 110.

Relay 130 has at least one normally-open contact N/O that is connected to terminal 3 of alarm circuit 110, and at least one normally-closed contact N/C that is connected to terminal 4 of alarm circuit 110. Normally-closed contact N/C also connects to level gauge 150. The common terminal C of relay 130 connects to sending unit 145.

Terminal 2 of alarm circuit 110 is connected to system ground and terminal 5 of alarm circuit 110 provides output 115 of controller 100.

In existing installations, sending unit 145 would likely be connected to level gauge 150. To achieve isolation, this connection must be severed 147 and sending unit 145 and level gauge 150 each connected to controller 100 as described above.

To activate high-level monitoring mode, a user will toggle selector switch 120 to a first position such that terminal 3 is connected to terminal 5 and terminal 4 is connected to terminal 6. This configuration will provide a ground connection to LED1, causing it to illuminate, and a ground connection first end of coil K. The configuration also provides input voltage 90 to alarm circuit 110 and input voltage 90 to a second end of coil K. Coil K is thus energized and normally-open contact N/O closes, thereby connecting sending unit 145 to alarm circuit 110, and normally-closed contact N/C opens, thereby isolating sending unit 145 from level gauge 150, which is connected to terminal 4 of alarm circuit 110. Alarm circuit 110 provides an intrinsically safe voltage to sending unit 145 via terminal 3.

Alarm circuit 110 is thus armed for high-level mode monitoring. Alarm circuit 110 will remain armed until sending unit 145 provides a signal (or resistance) corresponding the high-level set point established by the logic of alarm circuit 110, discussed below. When sending unit 145 provides a signal corresponding the high-level set point, output 115 of alarm circuit 110 will energize, thereby enabling power to be supplied to relays, solenoid valves, motors, pumps, alarm horns, etc. In another embodiment, two high-level set points are made, thus enabling a preliminary output 115 to be provided at a first high-level (high) and a second output 115 to be provided at a second high-level (high-high). Such a configuration could provide warning that a critical high level, established by the second set point, is approaching. Output 115 can be disengaged by toggling selector switch 120 to a center-off position, thereby removing power from alarm circuit 110.

To activate low-level monitoring mode, a user will toggle selector switch 120 such that terminal 3 is connected to terminal 1 and terminal 4 is connected to terminal 2. This configuration will provide a ground connection to LED2, causing it to illuminate when power source 95 is available, and remove a ground connection a first end of coil K, causing it to de-energize. Because coil K is de-energized, the normally-open contact N/O of relay 130 is open, and the normally-closed contact N/C of relay 130 is closed, thus connecting sending unit 145 to level gauge 150, which provides intrinsically safe voltage to the sending unit. The configuration also provides input voltage 95 to alarm circuit 110.

Alarm circuit 110 is thus armed for low-level mode monitoring. Alarm circuit 110 will remain armed until sending unit 145 provides a signal (or resistance) corresponding the low-level set point established by the logic of alarm circuit 110, discussed below. When sending unit 145 provides a signal corresponding the low-level set point, output 115 of alarm circuit 110 will energize, thereby enabling power to be supplied to relays, solenoid valves, motors, pumps, alarm horns, etc. In another embodiment, two low-level set points are established, thus enabling a preliminary output 115 to be provided at a first low-level (low) and a second output 115 to be provided at a second high-level (low-low). Such a configuration could provide warning that a critical low level, established by the second set point, is approaching. Output 115 can be disengaged by toggling selector switch 120 to a center-off position, thereby removing power from alarm circuit 110.

To maintain controller 100 in a disengaged mode, selector switch 120 should be toggled in its center-off position, thereby decoupling ground and power connections to alarm circuit 110. The high/low level alarm controller 100 is ideal for installation in marine craft requiring monitoring of fuel and fluid levels.

Figure 2:
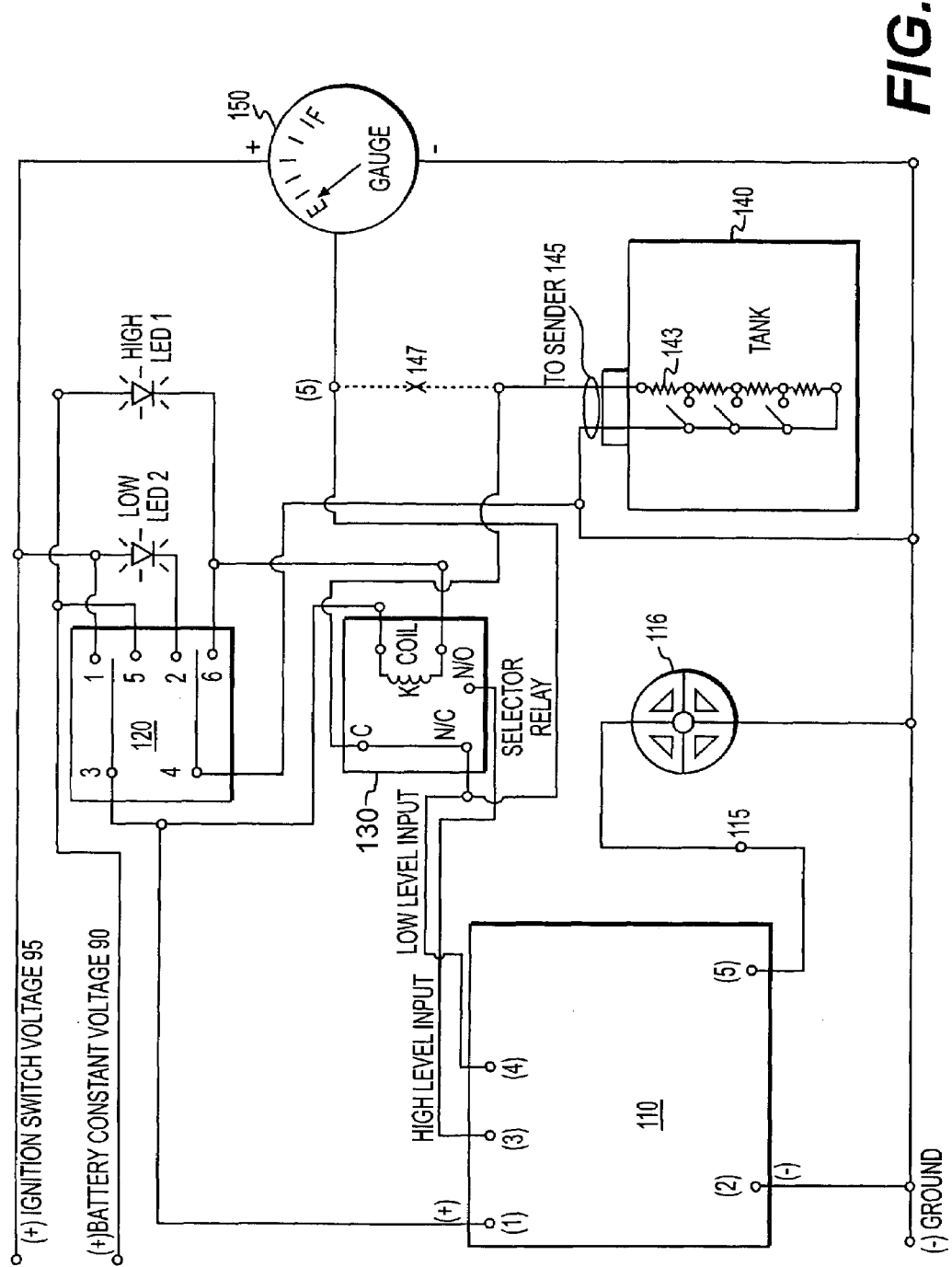
FIG. 2 illustrates a schematic diagram of the wiring diagram illustrated in FIG. 1.

FIG. 2 illustrates a schematic diagram of an application of the wiring diagram illustrated in FIG. 1. In this embodiment, alarm horn 116 is connected to output 115 of alarm circuit 110, selector switch 120 is shown in the center-off position, and relay 130 is show in a de-energized state.

Figure 3:
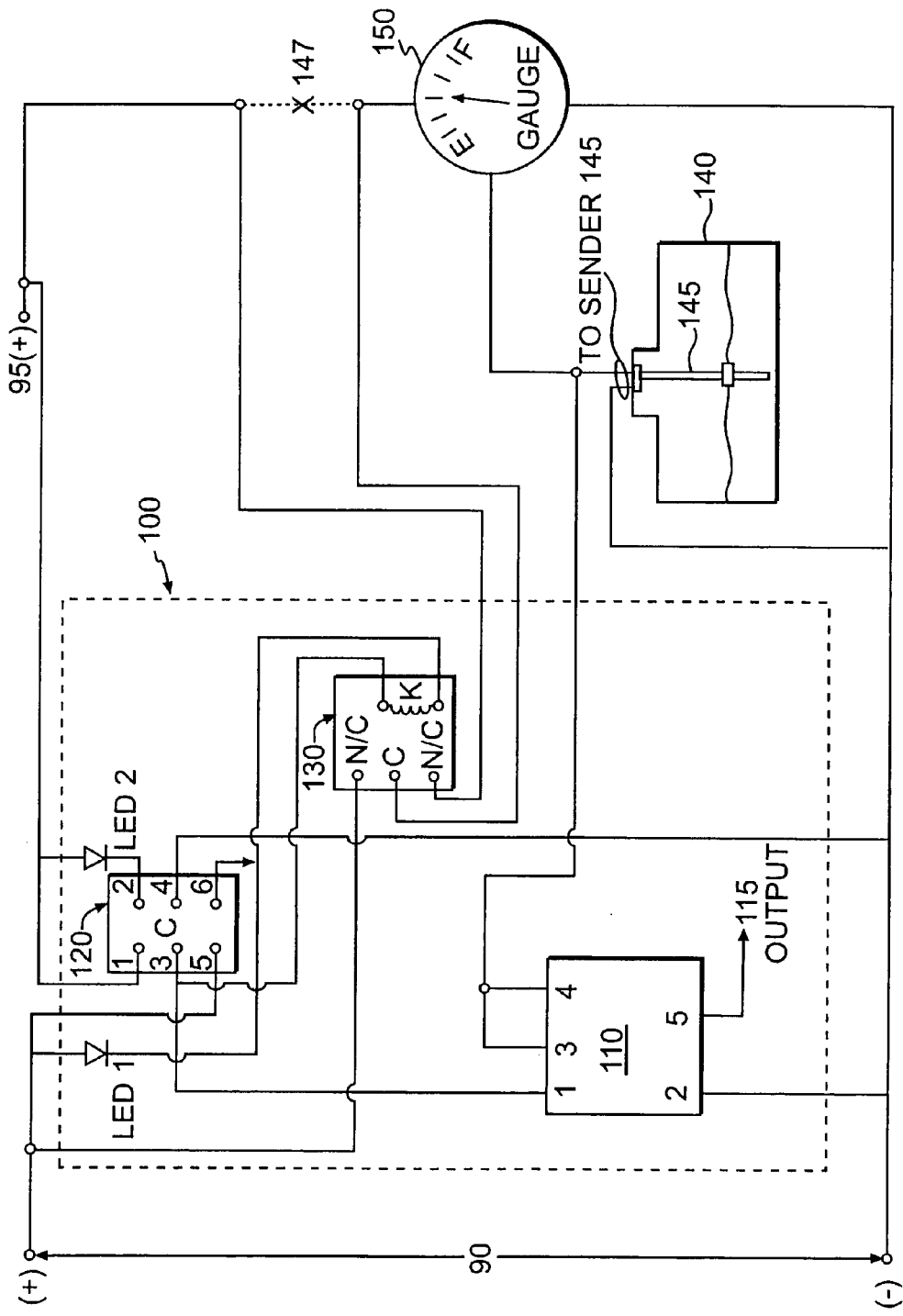
FIG. 3 illustrates a wiring diagram of another embodiment of a high/low level alarm controller.

FIG. 3 illustrates a wiring diagram of the high/low level alarm controller 100 configured in accordance with another embodiment of the present invention. Controller 100 provides three modes of operation: high-level monitoring mode, low-level monitoring mode, and disengaged, i.e., off. The embodiment illustrated in FIG. 3 discloses isolation of level sending unit 145 and level gauge 150 when controller 100 is in the high-level monitoring mode. Isolation of sending unit 145 and level gauge 150 removes them from daisy-chain wiring harness of typical installations, thereby preventing unwanted voltage from powering-up external instruments and sensors while controller 100 is monitoring high-level.

Operating modes for controller 100 are established via selector switch 120. FIG. 3 illustrates selector switch 120 as a double-pole double-throw (DPDT) center off switch (i.e., a three position switch), but selector switch 120 can be of any multi-pole switch configuration to effectuate mode selection of controller 100. Operating modes could also be selected by using a plurality of single-pole switches. Selector switch 120 is illustrated in FIG. 3 as having six terminals for external connection. High-level monitoring mode is selected by toggling selector switch 120 such that terminal 3 is connected to terminal 5 and terminal 4 is connected to terminal 6. Low-level monitoring mode is selected by toggling selector switch 120 such that terminal 3 is connected to terminal 1 and terminal 4 is connected to terminal 2. The 'off' mode is selected by placing selector switch 120 in the center position.

Intermediate control of controller 100 is facilitated by relay 130. FIG. 3 illustrates relay 130 as a two contact (normally-open and normally-closed) relay with a common. Intermediate control of controller 100 can, however, be achieved with a plurality of single contact relays or multiple contact relays. Further, FIG. 3 illustrates relay 130 as an electro-mechanical relay but relay 130 can also be a solid-state relay or the intermediate control can also be effectuated through use a transistor circuit configured to perform the function of relay 130.

Alarm circuit 110 provides control logic to drive output 1115 of controller 100. Alarm circuit 110 is illustrated in FIG. 3 as having five terminal connections. A detailed description of alarm circuit 110 is provided below.

High/low level alarm controller 100 utilizes two power connections: one power connection that couples to a steady source 90 and another power connection that couples to a switched or keyed source 95, such as might be available from an ignition key. Power source 90 connects to terminal 5 of selector switch 120 and the anode terminal of light emitting diode 1 (LED1). Power source 95 connects to terminal 1 of selector switch 120 and the anode terminal of light emitting diode 2 (LED2). The cathode of LED1 is connected to terminal 6 of selector switch 120 and a first end of coil K within relay 130. The cathode terminal of LED2 connects to terminal 2 of selector switch 120. Terminal 4 of selector switch 120 is connected to system ground; and terminal 3 of selector switch 120 is connected to a second end of coil K within relay 130, and terminal 1 of alarm circuit 110.

Relay 130 has at least one normally-open contact N/O that is connected to power source 90, and at least one normally-closed contact N/C that is connected to power source 95. The common terminal C of relay 130 connects to level gauge 150.

Terminals 3 and 4 of alarm circuit 110 connect together and are connected to sender unit 145 and gauge 150. Terminal 2 of alarm circuit 110 is connected to system ground and terminal 5 of alarm circuit 110 provides output 115 of controller 100.

To activate high-level monitoring mode, a user will toggle selector switch 120 to a first position such that terminal 3 is connected to terminal 5 and terminal 4 is connected to terminal 6. This configuration will provide a ground connection to LED1, causing it to illuminate, and a ground connection first end of coil K of relay 130. The configuration also provides input voltage 90 to alarm circuit 110 at terminal 1 and input voltage 90 to a second end of coil K. Coil K is thus energized and normally-open contact N/O closes, thereby connecting gauge 150 to power source 90, and normally-closed contact N/C opens, thereby disconnecting gauge 150 from power source 95, thus isolating level gauge 150 along with sending unit 145, which is connected to terminals 3 and 4 of alarm circuit 110. Gauge 150 provides an intrinsically safe voltage to sending unit 145 and alarm circuit 110.

Alarm circuit 110 is thus armed for high-level mode monitoring. Alarm circuit 110 will remain armed until sending unit 145 provides a signal (or resistance) corresponding the high-level set point established by the logic of alarm circuit 110, discussed below. When sending unit 145 provides a signal corresponding the high-level set point, output 115 of alarm circuit 110 will energize, thereby enabling power to be supplied to relays, solenoid valves, motors, pumps, alarm horns, etc. In another embodiment, two high-level set points are made, thus enabling a preliminary output 115 to be provided at a first high-level (high) and a second output 115 to be provided at a second high-level (high-high). Such a configuration could provide warning that a critical high level, established by the second set point, is approaching. Output 115 can be disengaged by toggling selector switch 120 to a center-off position, thereby removing power from alarm circuit 110.

To activate low-level monitoring mode, a user will toggle selector switch 120 such that terminal 3 is connected to terminal 1 and terminal 4 is connected to terminal 2. This configuration will provide a ground connection to LED2, causing it to illuminate when power source 95 is available, and remove a ground connection a first end of coil K, causing it to de-energize. Because coil K is de-energized, the normally-open contact N/O of relay 130 is open, and the normally-closed contact N/C of relay 130 is closed, thus connecting gauge 150 to power source 95.

Alarm circuit 110 is thus armed for low-level mode monitoring. Alarm circuit 110 will remain armed until sending unit 145 provides a signal (or resistance) corresponding the low-level set point established by the logic of alarm circuit 110, discussed below. When sending unit 145 provides a signal corresponding the low-level set point, output 115 of alarm circuit 110 will energize, thereby enabling power to be supplied to relays, solenoid valves, motors, pumps, alarm horns, etc. In another embodiment, two low-level set points are established, thus enabling a preliminary output 115 to be provided at a first low-level (low) and a second output 115 to be provided at a second high-level (low-low). Such a configuration could provide warning that a critical low level, established by the second set point, is approaching. Output 115 can be disengaged by toggling selector switch 120 to a center-off position, thereby removing power from alarm circuit 110.

To maintain controller 100 in a disengaged mode, selector switch 120 should be toggled in its center-off position, thereby decoupling ground and power connections to alarm circuit 110.

Figure 4:
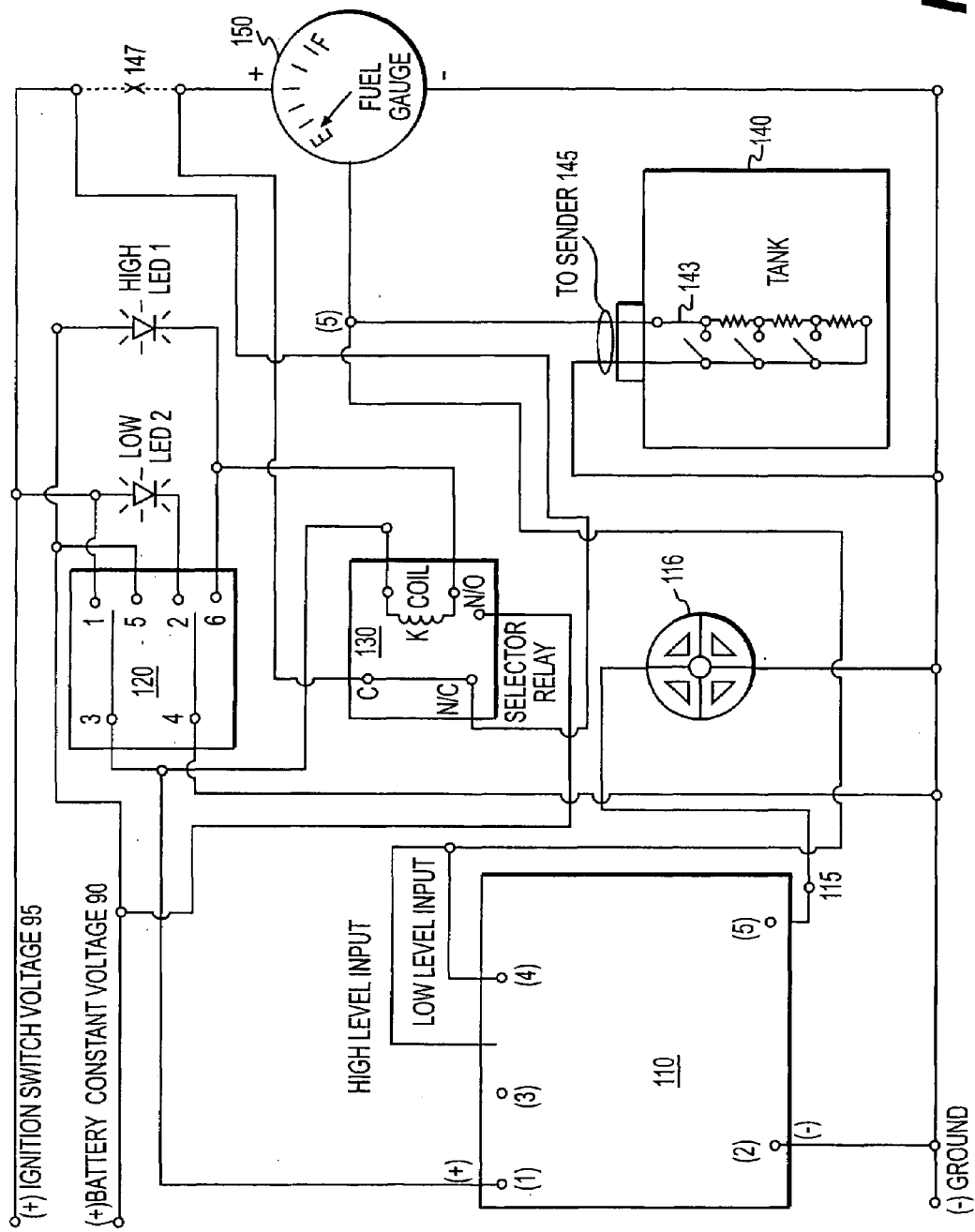
FIG. 4 illustrates a schematic diagram of the wiring diagram illustrated in FIG. 3.

FIG. 4 illustrates a schematic diagram of an application of the wiring diagram illustrated in FIG. 2. In this embodiment, alarm horn 116 is connected to output 115 of alarm circuit 110, selector switch 120 is shown in the center-off position, and relay 130 is show in a de-energized state.

Figure 5:
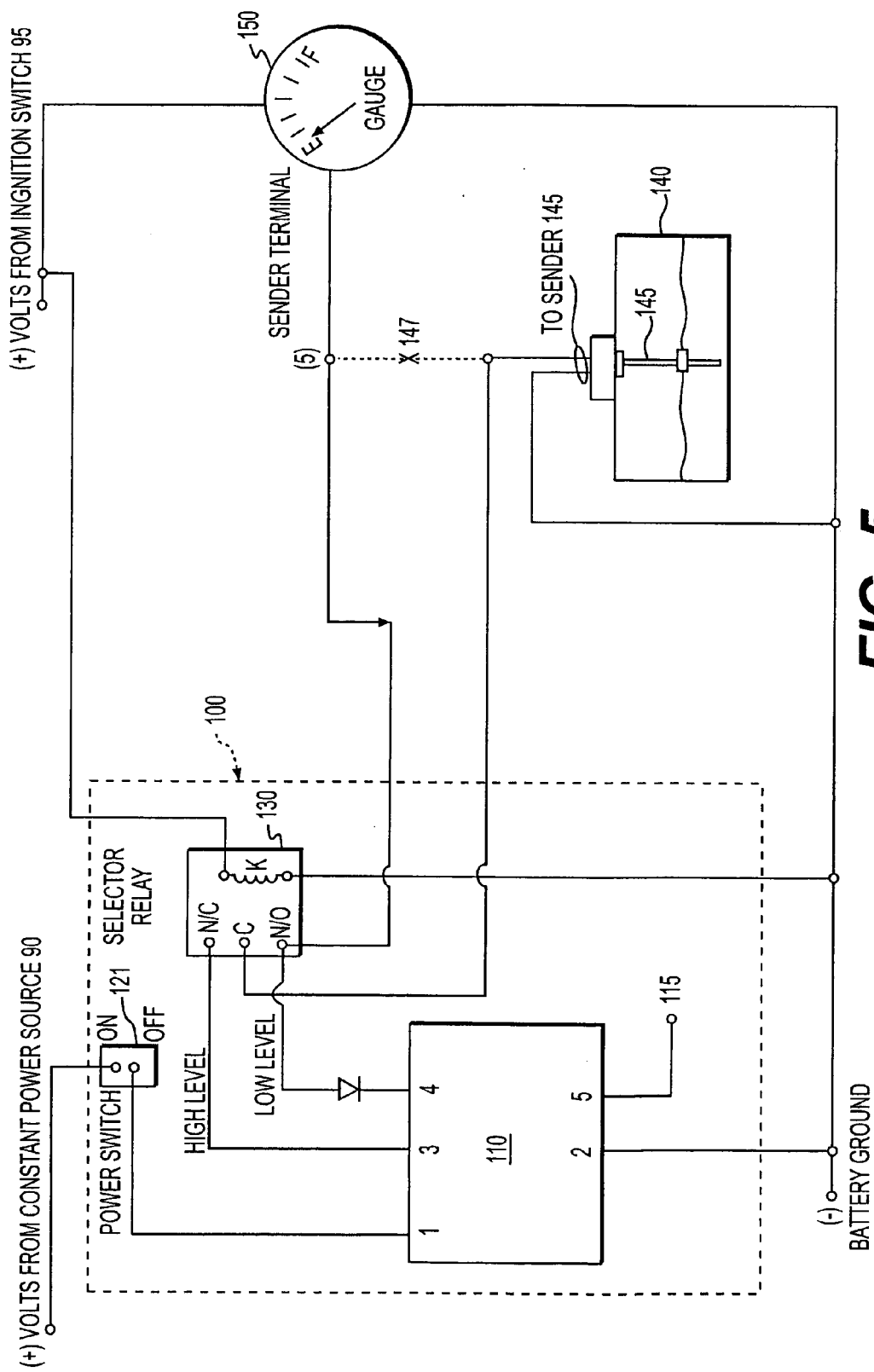
FIG. 5 illustrates a wiring diagram of another embodiment of a high/low level alarm controller.

FIG. 5 a wiring diagram of the high/low level alarm controller 100 configured in accordance with another embodiment of the present invention. The embodiment illustrated in FIG. 5 is similar to that illustrated in FIG. 1 except that selector switch 120 has been replaced by power switch 121, and the high/low level alarm controller 100 is configured to operate automatically based on the position of power switch 121 and power source 95. The embodiment illustrated in FIG. 5 discloses isolation of level sending unit 145 from level gauge 150 when controller 100 is in the high-level monitoring mode. Level sending unit 145 is installed within tank 140. In the high-level monitoring mode, sending unit 145 is powered by alarm control circuit 110, which obtains power independent of system instrumentation, such as gauge 150. Alarm control circuit 110 provides an intrinsically safe voltage to sending unit 145.

Power switch 121 connects alarm control circuit 110 to power source 90. By toggling power switch 121 to the 'on' position, alarm control circuit 110 will be energized and capable of performing level monitoring functions. Low-level monitoring mode occurs when power source 95 is available, which energizes coil K of relay 130, and power switch 121 is toggled to the 'on' position, which arms alarm control circuit 110. When relay 130 is energized, normally-open contact N/O connects sending unit 145 to gauge 150, which provides intrinsically safe voltage to sending unit 145. Alarm control circuit 110 will remain armed until sending unit 145 provides a signal (or resistance) corresponding the low-level set point established by the logic of alarm control circuit 110, discussed below. When sending unit 145 provides a signal corresponding the low-level set point, output 115 of alarm control circuit 110 will energize, thereby enabling power to be supplied to relays, solenoid valves, motors, pumps, alarm horns, etc. In another embodiment, two low-level set points are established, thus enabling a preliminary output 115 to be provided at a first low-level (low) and a second output 115 to be provided at a second high-level (low-low). Such a configuration could provide warning that a critical low level, established by the second set point, is approaching. Output 115 can be disengaged by toggling power switch 121 to the 'off', thereby removing power from alarm control circuit 110.

High-level monitoring occurs when power source 95 is removed, i.e., switched 'off,' and power switch 121 is toggled to the 'on' position, which arms alarm control circuit 110. Because power source 95 is removed, relay 130 is de-energized and sender unit 145 connects to alarm control circuit 110 via the normally-closed contact N/C of relay 130. Sender unit 145 is thus isolated from gauge 150. Alarm control circuit 110 provides an intrinsically safe voltage to sending unit 145. Alarm control circuit 110 will remain armed until sending unit 145 provides a signal (or resistance) corresponding the high-level set point established by the logic of alarm control circuit 110, discussed below. When sending unit 145 provides a signal corresponding the high-level set point, output 115 of alarm control circuit 110 will energize, thereby enabling power to be supplied to relays, solenoid valves, motors, pumps, alarm horns, etc. In another embodiment, two high-level set points are made, thus enabling a preliminary output 115 to be provided at a first high-level (high) and a second output 115 to be provided at a second high-level (high-high). Such a configuration could provide warning that a critical high level, established by the second set point, is approaching. Output 115 can be disengaged by toggling power switch 121 to the 'off' position, thereby removing power from alarm control circuit 110.

To maintain controller 100 in a disengaged mode, power switch 121 should be toggled in its 'off' position, thereby decoupling power connections to alarm control circuit 110.

Figure 6:
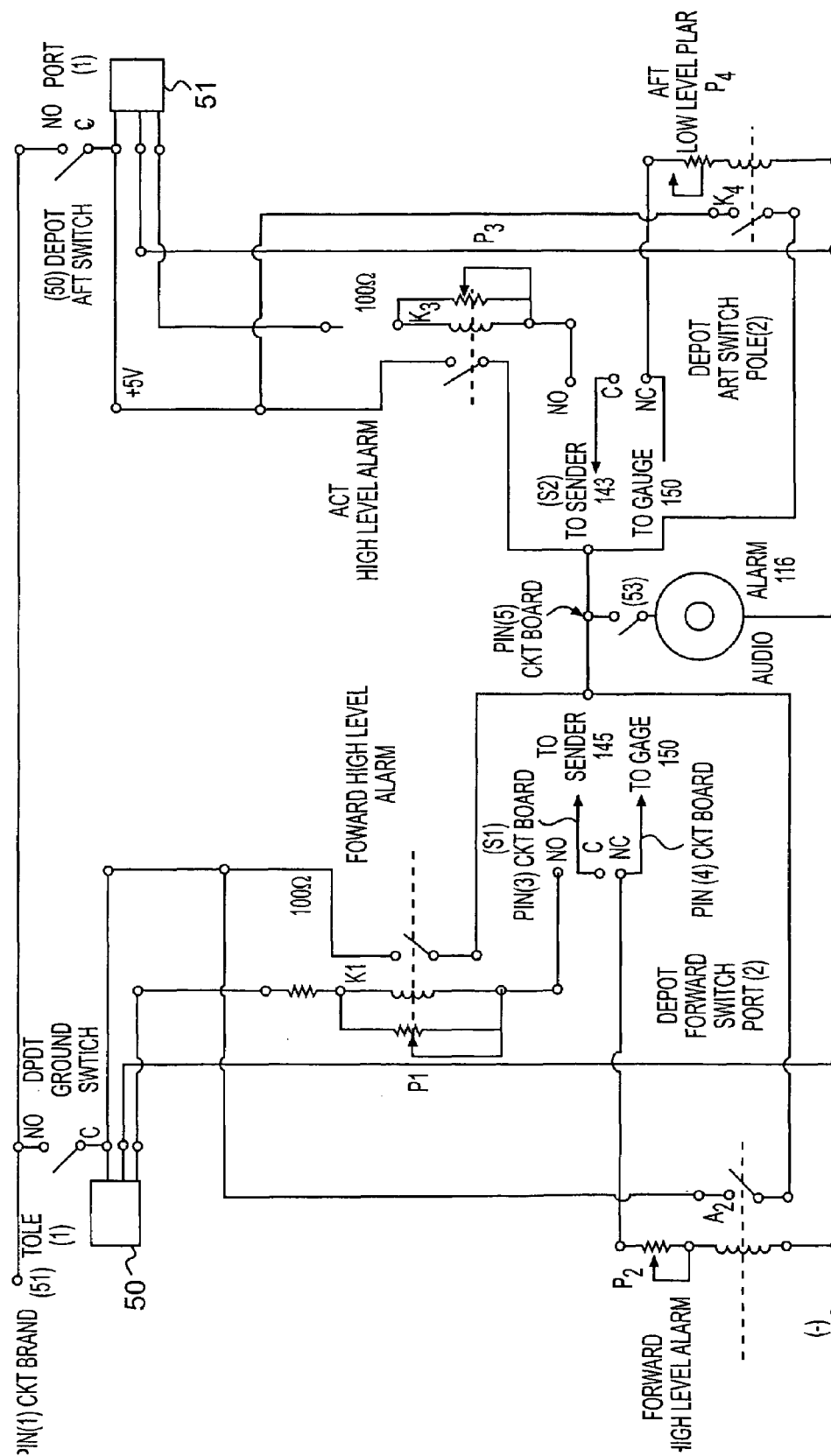
FIG. 6 illustrates a schematic diagram of alarm control circuit 110 in accordance with an embodiment of the present invention.

FIG. 6 illustrates a schematic diagram of alarm control circuit 110 in accordance with an embodiment of the present invention. FIG. 6 provides for high/low level control of two tanks (forward and aft) employing similar level monitoring circuitry. Input power is provided to terminals 1 and 2 of alarm control circuit 110. Input power to alarm control circuit 110 can be via a bridge rectifier to safeguard against changes in polarity. When pole 1 of S1 is closed, voltage is supplied to voltage regulator 50, which in turn provides a regulated voltage supply. High-level monitoring mode is available when pole 2 of SI is toggled such that the sender unit 145 (not shown) is connected to the coil of relay K1. Potentiometer P1, which adjusts the high-level set point, is connected in parallel to the coil of relay K1. As the voltage at sending unit 145 decreases (voltage decreases as tank level fills), more current will be drawn through the coil of relay K1. When the voltage reaches the high set-point, the current will be such that relay K1 will energize and drive output voltage to terminal 5. FIG. 6 illustrates alarm 116 being connected to terminal 5. To disengage alarm 116, S3 can be toggled to the open position.

In low-level monitoring mode, pole 2 of S1 is toggled to connect gauge 150 and sending unit 145 to potentiometer P2. As level in tank 140 (not shown) decreases, the voltage available at P2 will increase, thereby causing more current to flow through the coil of relay K2. When the level drops down to the low-level set point (set by adjusting P2), relay K2 will energize and drive output voltage to terminal 5, which sounds alarm 116. To disengage alarm 116, S3 can be toggled to the open position.

Description for the Aft tank components is the same as that of the Forward tank just described.

Figure 7:
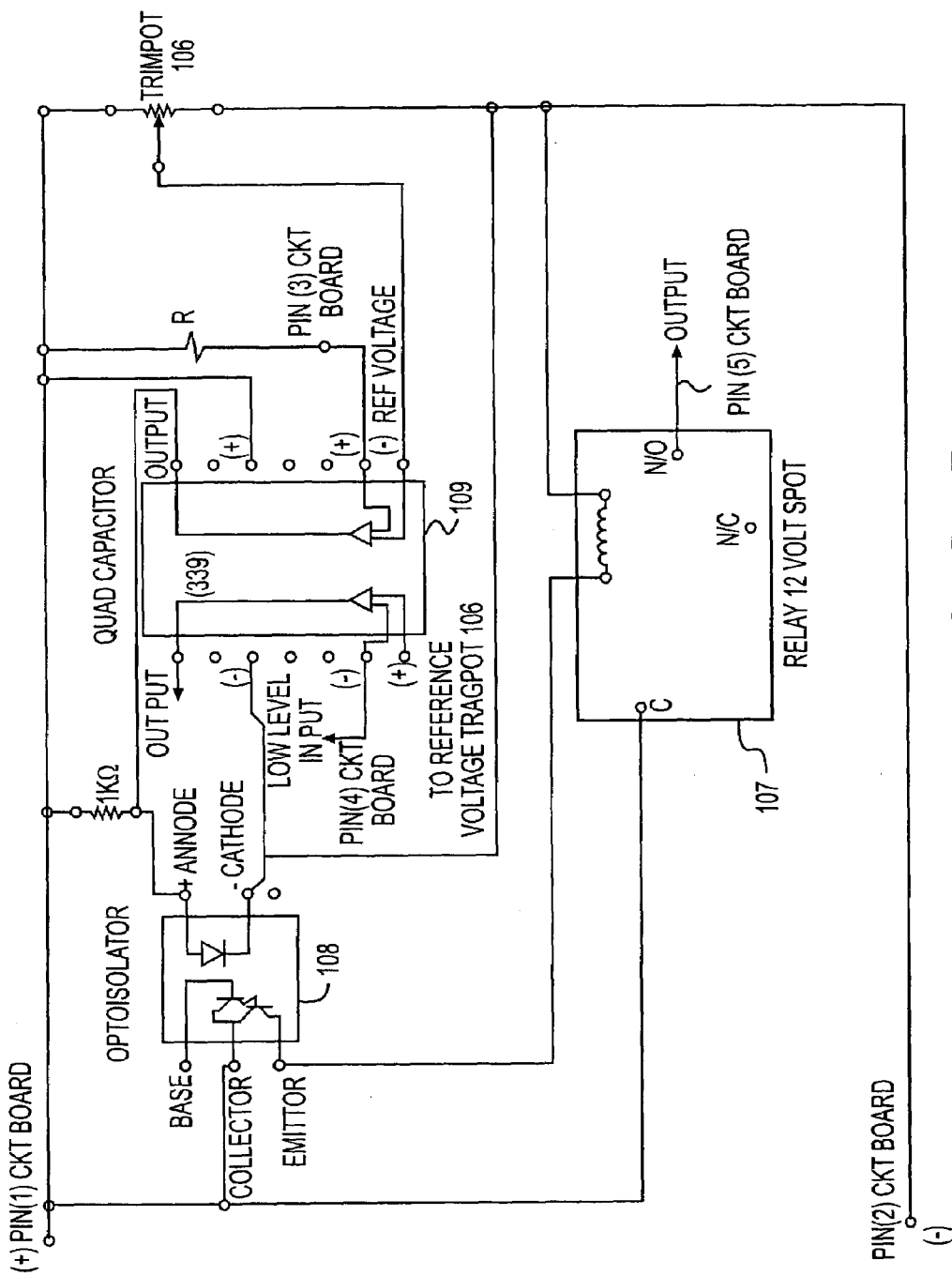
FIG. 7 illustrates a schematic diagram of alarm control circuit 110 in accordance with an embodiment of the present invention.

FIG. 7 illustrates a schematic diagram of alarm control circuit 110 in accordance with an embodiment of the present invention. The embodiment of alarm control circuit 110 illustrated in FIG. 7 utilizes an opto-isolator 108 in conjunction with comparator 109. Comparator 109 can be any comparator known to those in the art, such as a 339 Quad Comparator, which utilizes four (4) differential comparators on a single chip, thus providing the capacity to monitor level in multiple tanks.

In high-level monitoring mode, one input to comparator 109 is formed by a reference voltage established by trimpot potentiometer 106, which is connected to supply voltage at terminal 1 of alarm control circuit 110. Input power to alarm control circuit 110 can be via a bridge rectifier to safeguard against changes in polarity. A second input to comparator 109 is provided by sender unit 145 (not shown), which is connected to alarm control circuit 110 terminal 3. Current limited power is available to sender unit 145 via pull-up resistor R. As level within tank 140 (not shown) rises, the voltage at sending unit 145 is reduced. When the level corresponding to the voltage set by trimpot 106 is reached, comparator 109 triggers and the output of the comparator drives opto-isolator 108, which in turn energizes relay 107 to provide output 115 at terminal 5 until power is disconnected at terminal 1. Additional trimpots 106 will be required for each additional set point desired, such as high-low and high-high set points.

In low-level monitoring mode, the circuit operates in the same manner as the high-level mode except that the input voltage is supplied via terminal 4. Output and reference voltage of low-level monitoring mode are not shown to maintain clarity of the drawing but mirror that of the high-level mode.

Figure 8:
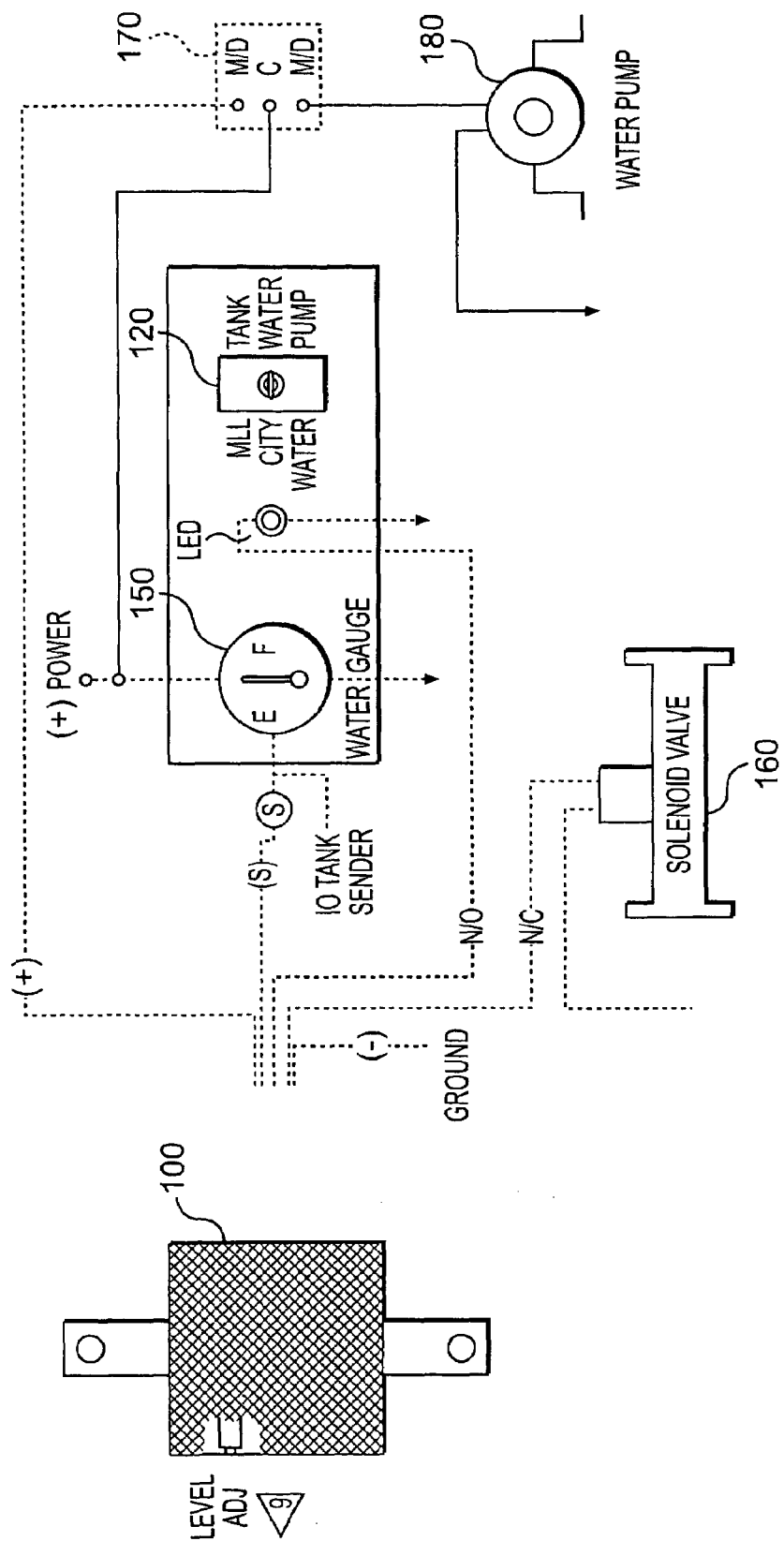
FIG. 8 illustrates the components of an embodiment of a high/low level alarm controller configured to monitor water fill.

The present invention has application to fuel tanks but is not limited to cooperation with fuel tanks and can also be used to signal and control level in any liquid storage tank, such fresh or potable water tanks, black water tanks, grey water tanks, chemical tanks, etc. For example, FIG. 8 illustrates another embodiment of the present invention featuring the high/low level alarm controller configured to monitor operations of a fresh water tank. Water tanks are typically constructed of thin roto-molded plastic material. The vent on the water tank is sized so that it can adequately vent air but once liquid enters the vent area the liquid becomes a back-pressure source and clogs the vent while the water is trying to escape. This causes the municipal water pressure to be backed-up into this tank, and since the tanks are typically only rated at about 10 lbs, it doesn't take much pressure to damage the tank. So if a municipal water source of about 40 or 50 lbs is employed to fill the tank, the tank can split at the seams. And this is what happens at the marine level. In a less extreme case the tank becomes distorted and actually stays that way. Thus, the high/low level alarm controller can be configured to monitor operations of a fresh water tank to prevent this damage from occuring.

Referring to FIG. 8, the high/low level alarm controller 100 is outfitted with a three position mode selector switch 120: 1) first position activates filling of fresh water tank; (2) the second position is a neutral or middle position, which is the position that gives the boat municipal water. When stationed at dock, the water system is not drawing water from the on-board fresh water tank, the system uses pressurized water that comes that is available from the municipality. When ready to disconnect from the municipal water supply, position three is selected (3), which then powers an internal water pump that pressurizes the boat from its own water pump system. Thus, the controller has three functions, which are selectable via selector switch 120.

Solenoid valve 160 is a normally-closed electrically operated water valve. The coil of valve 160 is attached to relay 130 (internal to controller 100). When ready to fill the water tank, selector switch 120 is positioned to the 'Fill' mode, which energizes relay 130 and opens up valve 160, allowing water to flow. Controller 100 is armed and waiting to shut off valve 160 when the water in the tank gets to the high level point by de-energizing relay 130. LED illuminates when process is complete. For controller 100, 'Fill' mode is equivalent to "high-level" monitoring mode described in the preceding embodiments. The water tank has sending unit 145 installed. Sending unit 145 activates level gauge 150, which can be analog or digital.

Positioning selector switch 120 to the center position ("City") opens a second valve (not shown) that is in parallel with fill valve 160. And this second valve allows municipal water to go directly into the vessel, bypassing the water tank. Thus, the internal system is supplied with municipal water until ready to disconnect from the dock. Fill valve 160 remains de-energized and closed.

When ready to leave the dock, selector switch 120 is toggled to the third position, which drives relay 170 to provide electrical power to water pump 180 to provide internal pressurized water. Pump 180 receives a signal from a pressure switch (not shown) such that when the pressure in the system drops, as might occur when a faucet handle is turned. The pressure switch detects the drop in pressure and then signals relay 170 to provide power to pump 180 to build the pressure back up; pump 180 is taking its water from the internal tank that was filled during the 'Fill' mode. The system will remain in this position as long as the boat is at sea. Gauge 150 can be used to continuously monitor the level in the water tank.

The water tank has a second (redundant) level switch (not shown) that will disable fill valve 160 if sending unit 145 fails. The second level switch is within a short stem hanging from the top of the tank and uses just one switch and float to activate the high level signal, i.e., single-point level detection (as opposed to continuous level monitoring as is provided by sending unit 145).

Figure 9:
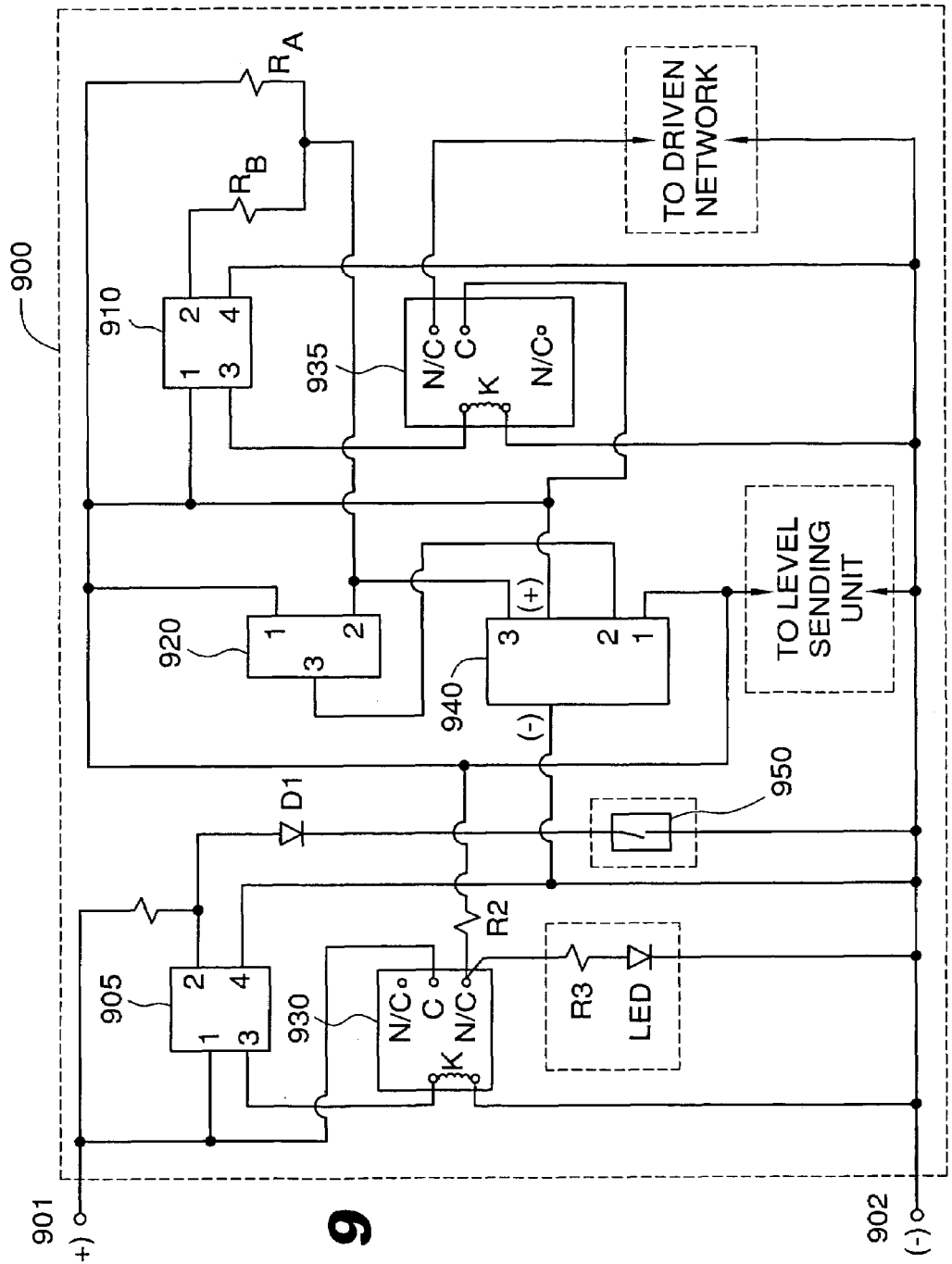
FIG. 9 illustrates a wiring diagram of another embodiment of a high/low level alarm controller.

FIG. 9 illustrates a wiring diagram of the high/low level alarm controller 900 configured in accordance with another embodiment of the present invention. Controller 900 can provide three modes of operation: high-level monitoring mode, low-level monitoring mode, and disengaged, i.e., off. The embodiment illustrated in FIG. 9, however, discloses high-level monitoring only. Low-level monitoring can be achieved with the same circuit but with inverse control logic since the varying voltage that is supplied to the comparator via the sending unit increases as tank level falls, which is the voltage direction traversed in low-level applications. This would be achievable by a person of ordinary skill in the art.

The embodiment illustrated in FIG. 9 employs automatic activation of controller circuit 900. Automatic activation is achieved through magnetic switch 950 and an activator (not shown). The activator has an associated permanent magnet that can magnetically engage magnetic switch 950. The activator can be any device capable being moved near or away from magnetic switch 950 in order to magnetically trigger the switch; i.e., cause switch 950 to change states from open to closed and vice versa. When the activation unit is in proximity to magnetic switch 950, the switch is held closed and when the activator is moved away from switch 950 the switch opens. In this manner control of the high/low level alarm controller can be automated. In one embodiment the activator is a cap for a tank access port and has a permanent ring magnet attached, with magnetic switch 950 being fitted to the access tube (in near proximity to the cap) leading to the tank. Magnetic switch 950 can be any switching mechanism that is magnetically activated, such as reed or hall-effect switches.

In the embodiment illustrated in FIG. 9, high/low level alarm controller 900 employs two modes: high-level monitoring mode and disengaged (as discussed previously, low-level monitoring can be performed using the same circuit but with reverse control logic). Operating modes for controller 900 are established via magnetic switch 950, which is engaged by an activator (not shown), discussed above. When magnetic switch 950 is closed, which occurs when the activator is in near proximity to the switch, source power from contact 901 is delivered through current limiting resistor R1 and shunted to reference, or ground, at contact 902 through blocking diode D1. When magnetic switch 950 is open, source power from contact 901 is delivered through current limiting resistor R1 and passes through trigger 905 before shunting to reference at contact 902. Current limiting resistor R1 is of an appropriate value to limit power output from the source and thus protect the circuit and is typically in the range of around 500 to 1000 ohms.

Trigger 905 is a circuit element responsible for conveying power to energize relay 930. Trigger 905 can be any logic circuit or element that is capable of conditionally delivering power responsive to the state of the surrounding circuit. In one embodiment trigger 905 is an optocoupler. An optocoupler can be a two-port element comprising an internal light emitting diode (LED) on one port, and an internal photo-sensitive transistor on another port. As power is delivered to the internal LED, and the LED emits light, the internal photosensitive transistor conducts and delivers power through a second port. When the internal LED is not conducting, light is not emitted and the internal photosensitive transistor is nonconducting, i.e., "off." Referring to FIG. 9, in the embodiment where trigger 905 is an optocoupler, when magnetic switch 950 is open, power is delivered to the internal LED of trigger 905 through an input at contact 2. Current conducts through the diode, exiting at contact 4, and light is emitted, thereby causing the internal transistor to conduct, i.e., turning the internal transistor 'on.' The internal transistor receives input power through the input at contact 1, and delivers power through the output at contact 3.

When power is available from the output of trigger 905, coil K of relay 930 is energized and the contacts of relay 930 change state from normally-open to closed, and from normally-closed to open. The common C of relay 930 is coupled to input 1 of trigger 905, which is coupled to source power at contact 901. Thus, when relay 930 is energized, normally-open contact N/O closes to common C and source power is then available at the contact. When source power is available at normally-open contact N/O, power is then available to the alarm control unit of the high/low level alarm controller 900. Optional current limiting resistor R3 and LED can be provided to signal activation of the controller.

Alarm control of the high/low level alarm controller 900 is effectuated via comparator 940. Comparator 940 can be any comparator known to those in the art, such as a 339 Quad Comparator, which utilizes four (4) differential comparators on a single chip, thus providing the capacity to monitor level in multiple tanks. In the embodiment of the high/low level alarm controller illustrated in FIG. 9, comparator 940 employs two inputs at contacts 1 and 2, and an output at contact 3. Because the comparator is an active element, it requires source and reference potentials, illustrated by (+) and (−), respectively.

The input to comparator 940 at contact 1 is formed by a varying voltage as available from the action of the level sending unit. As level rises and falls within a tank, the sending unit will yield a varying resistance, which translates to a varying voltage by virtue of the exciting power available through resistor R2. Level sending units typically receive their exciting power from the level gauge to which they are coupled. Because the high/low level alarm controller 900 will typically be operational when power from the level gauge is not available, the sending unit requires another source of power in order to function. Thus, the role of R2 is to emulate the internal resistance of a level gauge and supply exciting power to the level sending unit. R2 can be sized to match the internal resistance of any level gauge available, which is itself determined to excite an associated level sending unit. Level sending units typical have resistance ranges of 33 to 240 ohms, 0 to 180 ohms, and 0 to 90 ohms with R2 correspondingly ranging from between 1000 ohms to 100 ohms, accordingly.

Comparator 940 toggles when the voltage at comparator input contact 2 equals or falls below the voltage at comparator input contact 1. The voltage level at input contact 2 necessary to cause comparator 940 to toggle is called the set point voltage and is established to correspond to a particular level in a tank. Tank level is represented by the action of the level sending unit. Thus, comparator 940 can be programmed to toggle at a desired tank level. Output of comparator 940 is available at contact 3 and comprises two states: when comparator 940 in un-toggled, the output at comparator contact 3 is reference, or ground potential; when comparator 940 toggles, the output at contact 3 provides high impedance, which represents an open circuit. Thus, the output states of comparator 940 can be a short-circuit to reference potential or an open circuit, depending on the voltage values at the inputs.

The set point level at comparator input contact 2 is initially provided via voltage allocator 920. Voltage allocator 920 is an adjustable circuit element capable of delivering, or allocating, an output voltage at contact 3 based on the potential difference between the allocator's input contacts 1 and 2. In one embodiment allocator 920 is a potentiometer but the allocator could also be a solid-state device as well. When allocator 920 is a potentiometer, voltage output at contact 3 can be programmed by virtue of adjusting the potential drop of the resistance between contacts 1 and 3 relative to the resistance between contacts 3 and 2.

When magnetic switch 950 opens, power is available through resistor R2 and the high/low level alarm controller is "armed" and ready to activate. In the "armed" or "ready" state, output at contact 3 of controller 940 is at reference, or ground, potential. Power delivered through resistor R2 divides, on one leg, to provide the exciting voltage for level sending unit operation, and on another leg to flow through resistor $R_A$ to ground via comparator output contact 3. Controller 900 remains in this "armed" state until the voltage available from the level sending unit matches the initial set point voltage established via allocator 920. When a voltage match occurs, i.e., the voltage at input contacts 1 and 2 of comparator 940 agree, comparator 940 toggles and output contact 3 changes to high impedance. This transition opens the power flow path from resistor $R_A$ to ground and forces power to flow through resistor $R_B$. The combination of resistor $R_A$ and resistor $R_B$ form a voltage divider to deliver power to trigger 910. As discussed above, a trigger is a circuit element responsible for conveying power, which in this case is to energize relay 935, and can be any logic circuit or element that is capable of conditionally delivering power responsive to the state of the surrounding circuit. In one embodiment trigger 910 is an optocoupler.

In embodiments where trigger 910 is an optocoupler, a light emitting diode (LED) is located between trigger contacts 2 and 4. When power flows through the voltage divider formed of resistors $R_A$ and $R_B$, it is available to activate trigger 910 by causing the internal LED to conduct and emit light. When light emits from the internal LED of trigger 910, an internal photosensitive transistor activates and conveys power through trigger output contact 3. As discussed previously with respect to trigger 905, the trigger's internal transistor receives input power through the input at contact 1 and delivers power through the output at contact 3.

When power is available from the output of trigger 910, coil K of relay 935 is energized and the contacts of relay 935 change state from normally-open to closed, and from normally-closed to open. The common C of relay 935 is coupled to an input of trigger 910, which is coupled to source power delivered through resistor R2. When relay 935 is energized, normally-open contact N/O closes to common C and source power is then available at the contact to drive the external driven network. Such an external driven network can be an audible or visual alarm, solenoid valve, or other such circuit requiring control as a function of tank level.

To prevent inadvertent re-toggling of comparator 940, i.e., chatter, due to random motion of the level sending unit, high/low level alarm controller 900 employs a shifting bias voltage at comparator input contact 2. Such a shifting bias voltage causes the initial set point voltage established by allocator 920 to transition to a subsequent voltage set point. The subsequent set point voltage is programmed to be beyond the random voltage fluctuation of the level sending unit. (Note that any movement in tank level, even when not associated with filling or evacuating the tank's contents, will cause fluctuation in the output of the level sending unit. Such movement or motion can occur when the tank installation is on a moving vessel, such as marine craft.) By setting the subsequent set point voltage beyond that of random fluctuation of the level sending unit, the high/low level alarm controller 900 is de-sensitized to chatter.

The bias voltage at comparator input contact 2 shifts because when comparator 940 toggles, output at contact 3 is of such high impedance that it is effectively an open circuit. Thus, input to contact 2 of allocator 920, the reference voltage for the allocator, shifts from reference or ground potential, which is the voltage available from comparator 940 output contact 3 before toggling, to a voltage provided from an output of the voltage divider formed of resistors $R_A$ and $R_B$ after the comparator has toggled. Resistors $R_A$ and $R_B$ are chosen so that adequate power can be delivered to trigger 910 at input contact 2, and also furnish adequate voltage at input contact 2 of allocator 920 in order to shift the bias voltage of the comparator by an amount adequate to eliminate chatter. In one embodiment, voltage divider resistors $R_A$ and $R_B$ are of a ratio on the order of 10:1. Thus, in such an embodiment, resistor $R_A$ could be 1000 ohms and resistor $R_B$ would therefore be 100 ohms. Though a ratio of 10:1 has been successfully demonstrated experimentally, other resistor ratios can also be employed, provided that adequate power can be delivered to both trigger 910 and allocator 920, as would be known to one of ordinary skill in the art. Because the voltage at allocator 920 input contact 2 has shifted from ground to a higher value, as provided by the voltage divider, the output voltage of allocator 920 at contact 3 shifts and thereby establishes a subsequent set point voltage for comparator 940.

The high/low level alarm controller 900 is de-energized, and power removed from the driven network, by causing magnetic switch 950 to close. Magnetic switch 950 closes when the activator (not shown), and its associated magnet, is brought within magnetic proximity to the switch. Other embodiments can feature a remote acknowledge button or switch to stimulate magnetic switch 950 to close. Further embodiments can provide for controller activation at dual levels. Thus, the controller could operate first when level is at one position, then the controller could be reset by virtue of an acknowledge trigger, and then activate a second time when the level reaches a second position; i.e., HIGH-LOW and HIGH-HIGH levels for high level monitoring, and LOW-HIGH and LOW-LOW levels for low level monitoring. Such modifications would be within the ordinary skill of the art.

Figure 10:
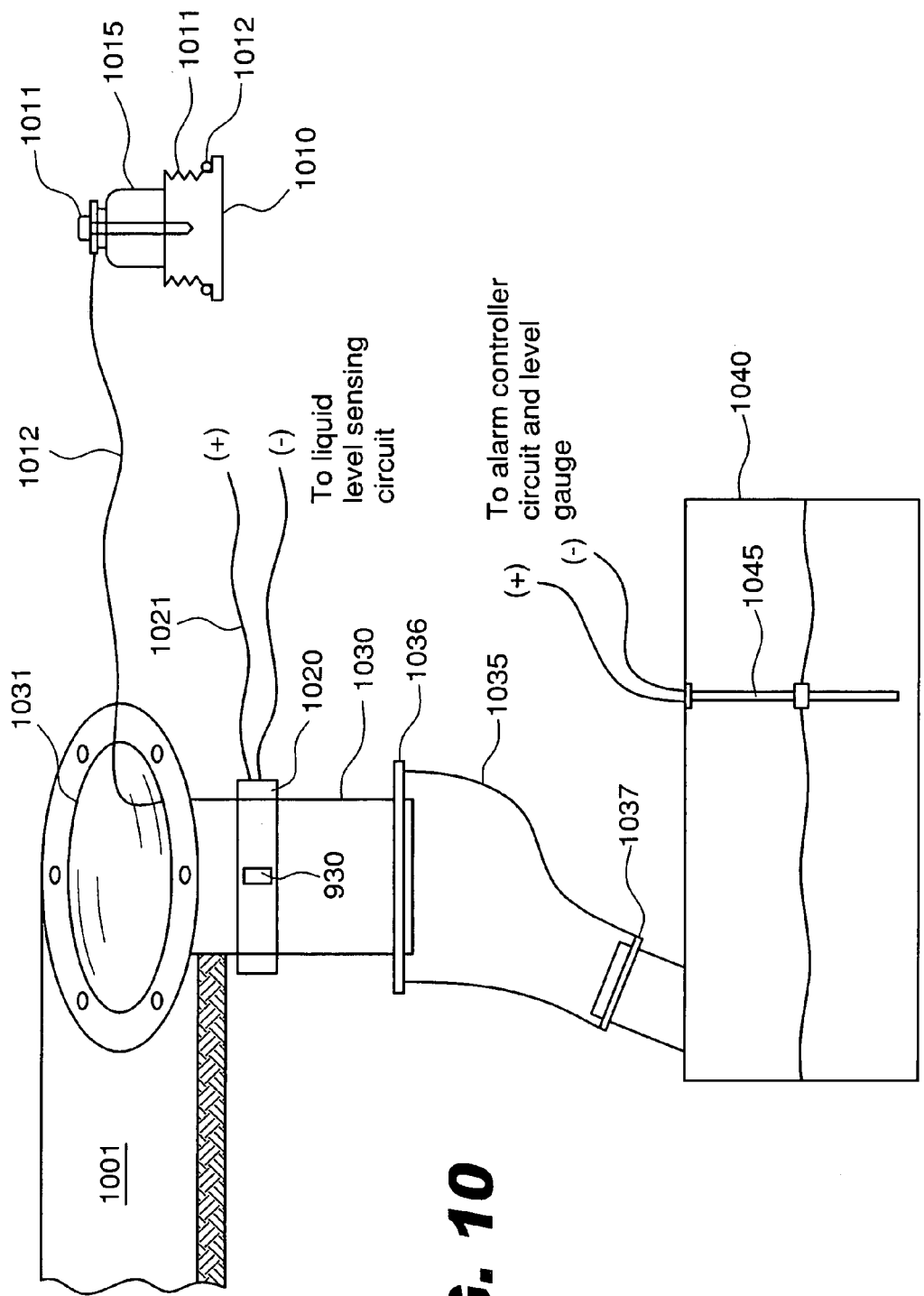
FIG. 10 illustrates an assemblage of components forming an embodiment of a high/low level alarm controller.

FIG. 10 illustrates an assemblage of components forming an embodiment of a high/low level alarm controller. Magnetic switch 950 is coupled to non-magnetic collar 1020, which in turn is fitted to access tube 1030 of tank 1040. Optionally, access tube 1030 can be modified by interposing a length of rubber hose 1035 between tube 1030 and tank 1040. Use of rubber hose 1035 can provide flexibility in access routing to tank 1040. Hose 1035 is coupled to access tube 1030 via clamp 1036, and to tank 1040 via clamp 1037. Magnetic switch 950 is coupled to the liquid level sensing circuit via wires 1021. The liquid level sensing circuit comprises the alarm controller circuit (not shown) and level sending unit 1045.

Magnetic switch 950 is engaged by activator 1010, which in this embodiment is formed of a cap to releasably seal access port 1031. Activator 1010 comprises threaded top 1011, seal ring 1012, permanent magnet 1015 and securing screw 1011. Activator 1010 couples to access port 1031 via tether 1012. Access port 1031 is available through floor structure 1001, which in some embodiments can be the deck of a boat. To toggle magnetic switch 950, and thereby activate or de-activate the liquid level sensing circuit, activator 1010 is simply installed or removed. Note that magnetic switch 950 and non-magnetic collar 1020 are located on access tube 1030 so that magnetic switch 950 is closed when activator 1010 is installed and open when activator 1010 is removed.

Figure 11:
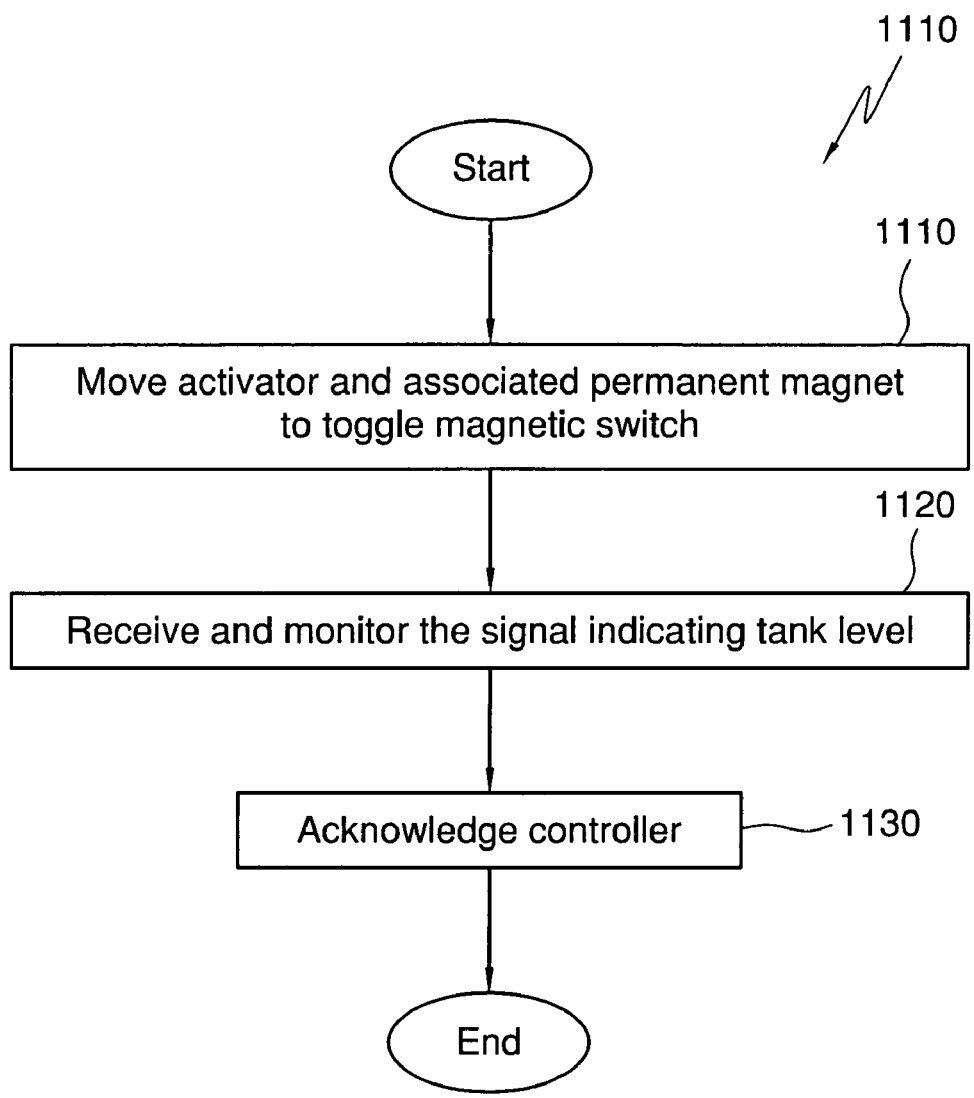
FIG. 11 illustrates a flow diagram describing the use of an embodiment of a high/low level alarm controller.

FIG. 11 illustrates a flow diagram describing the use of an embodiment of a high/low level alarm controller in accordance with the present invention. To start the control process 1100, in step 1110, the activator and associated permanent magnet are moved in order to toggle magnetic switch to an open position. In one embodiment, such a step could occur by removing the cap from a tank access tube. Once the activator is moved away from the magnetic switch, the switch is open and the high/low level alarm controller is armed and ready.

Next, in step 1120, a signal indicating tank level is received and monitored while tank level is rising due to the tank being filled, or falling due to the tank being evacuated. The high/low level alarm controller will generate an output to drive an external network, such as an alarm, when the tank level reaches a predetermined level set point amongst at least one level set point.

In step 1130, in response to an energized controller state, such as an alarm condition, the controller is acknowledged. The controller can be acknowledged by replacing the activator, or engaging an acknowledge circuit that will suspend the controller's energized state, such as an alarm condition. The high/low level alarm controller can then be available to energize or alarm at additional tank levels if the controller logic so provides. When the final energized or alarm condition has been acknowledged, the process ends.

Figure 12:
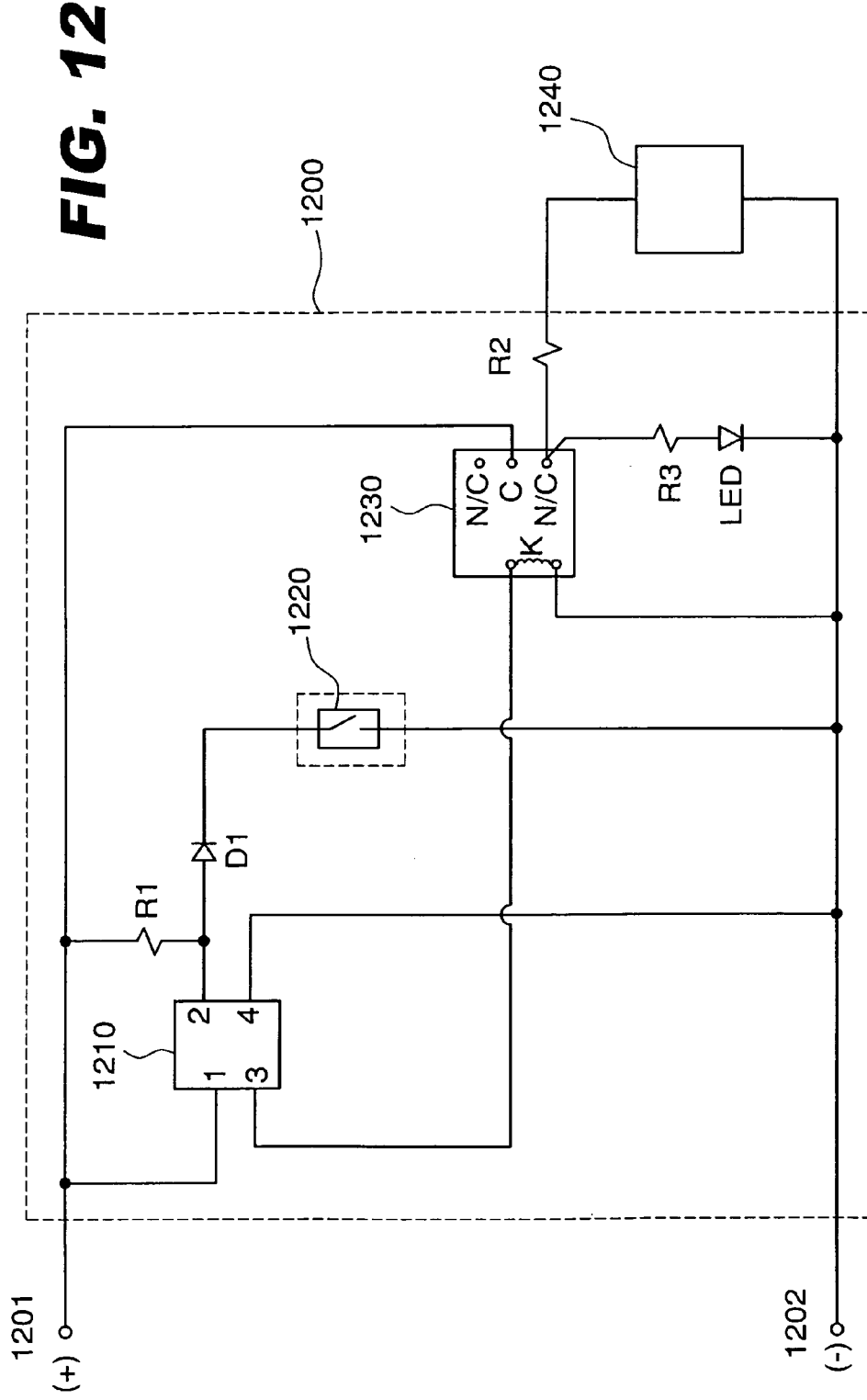
FIG. 12 illustrates a wiring diagram of an alarm control unit in accordance with an embodiment of the present invention.

FIG. 12 illustrates a wiring diagram of another embodiment of the high/low level alarm controller 1200. Controller 1200 is configured to provide automatic interlock for power delivered to external network 1240 as a function of magnetic switch 1220. The interlock of controller 1200 is established via magnetic switch 1220, which is engaged by an activator (not shown), discussed below. When magnetic switch 1220 is closed, which occurs when the activator is in near proximity to the switch, source power from contact 1201 is delivered through current limiting resistor R1 and shunted to reference, or ground, at contact 1202 through blocking diode D1. When magnetic switch 1220 is open, source power from contact 1201 is delivered through current limiting resistor R1 and passes through trigger 1210 before shunting to reference at contact 1202. Current limiting resistor R1 is of an appropriate value to limit power output from the source and thus protect the circuit and is typically in the range of around 500 to 1000 ohms.

Trigger 1210 is a circuit element responsible for conveying power to energize relay 1230. Trigger 1210 can be any logic circuit or element that is capable of conditionally delivering power responsive to the state of the surrounding circuit. In one embodiment trigger 1210 is an optocoupler. As discussed above, an optocoupler can be a two-port element comprising an internal light emitting diode (LED) on one port, and an internal photosensitive transistor on another port. As power is delivered to the internal LED, and the LED emits light, the internal photosensitive transistor conducts and delivers power through a second port. When the internal LED is not conducting, light is not emitted and the internal photosensitive transistor is nonconducting, i.e., "off." Referring to FIG. 12, in the embodiment where trigger 1210 is an optocoupler, when magnetic switch 1220 is open, power is delivered to the internal LED of trigger 1210 through an input at contact 2. Current conducts through the diode, exiting at contact 4, and light is emitted, thereby causing the internal transistor to conduct, i.e., turning the internal transistor 'on.' The internal transistor receives input power through the input at contact 1, and delivers power through the output at contact 3.

When power is available from the output of trigger 1210, coil K of relay 1230 is energized and the contacts of relay 1230 change state from normally-open to closed, and from normally-closed to open. The common C of relay 1230 is coupled to an input of trigger 1210, which is coupled to source power at contact 1201. Thus, when relay 1230 is energized, normally-open contact N/O closes to common C and source power is then available at the contact. When source power is available at normally-open contact N/O, power is then available to drive external circuit 1240. Optional current limiting resistor R2 can be provided to protect external circuit 1240. Optional current limiting resistor R3 and LED can be provided to signal activation of the controller.

This embodiment of the high/low level alarm controller 1200 employing automatic interlock is ideally suitable for marine craft applications. Many larger sized marine craft utilize a transom door. A transom door provides ready access to the boat's interior from a swim platform or handicapped access and typically swings in towards the boat interior. Thus, boat users need not straddle the side of the craft to gain access. Because the transom door swings towards the interior of the boat, the door can be located directly over the engine room hatch. In many larger boats, the engine room hatch is electrically driven. An operator can push a button to activate electric motors driving jack screws to raise or lower the engine room hatch. If the operator forgets to close the transom door prior to engaging the electric motor to raise the engine room hatch, the transom door can be sheared from its hinged attachment to the boat, thus destroying the door and necessitating costly repair. By locating a magnet in the transom door, and magnetic switch in the boat frame, magnetic switch 1220 of controller 1200 can be used to interlock power to the network driving the electric hatch motors 1240. Thus, the transom door serves as the activator of the interlock controller.

Numerous characteristics and advantages have been set forth in the foregoing description, together with details of structure and function. The novel features are pointed out in the appended claims. This disclosure, however, is illustrative only and changes may be made in detail within the principle of the invention to the full extent indicated by the broad general meaning of the terms in which the appended claims are expressed. For instance, the present invention is ideally suitable monitoring fuel capacity and filling on a ship, but it can also be applicable to general liquid storage that has level monitoring, such as that which may occur in Recreational Vehicles (RV), chemical plants, etc.

What is claimed is:

1. A high/low level alarm controller that monitors a signal from a liquid level sensor in a tank, comprising:
   a circuit that senses a pro-set liquid level;
   a magnetic switch coupled to an access tube associated with said tank, said magnetic switch being coupled to an Alarm Circuit; and
   a magnetic element arranged to engage said magnetic switch to control said Alarm Circuit.

2. The magnetic switch of claim 1, wherein said magnetic element is a permanent magnet coupled to a removable cap adapted to close access to said access tube.

3. An automatic high/low level alarm controller for monitoring a level, comprising:
   a magnetic switch having first and second ends, said second end for receiving a reference voltage; an activator coupled to said magnetic switch; a trigger having first and second inputs and an output, said first input being coupled to said first end of said magnetic switch and said second input for receiving a source voltage;
   a relay having first and second inputs and an output, said first input being coupled to said second input of said trigger, said second input being coupled to said output of said trigger; and
   an alarm control unit coupled to said output of said relay, said alarm control unit being adapted to provide electrical output responsive to said level.

4. The automatic high/low level alarm controller of claim 3, wherein said alarm control unit comprises a level sending unit and voltage comparator for receiving an adjustable voltage set paint, whereby said voltage set point corresponds to a specific level communicated by said level sanding unit.

5. The automatic high/low level alarm controller of claim 4, wherein said voltage comparator has a shifting bias voltage.

6. The automatic high/low level alarm controller of claim 5, wherein said shifting bias voltage comprises a first bias voltage corresponding to an initial voltage set point and at least one second bias voltage corresponding to a subsequent voltage set point.

7. The automatic high/low level alarm controller of claim 6, wherein said shifting bias voltage is supplied from a voltage allocator interposed between a primary voltage and an adjustable reference voltage, said initial voltage set point being correlated to an initial reference voltage and said subsequent voltage set point being correlated to a subsequent reference voltage.

8. The automatic high/low level alarm controller of claim 7, wherein said voltage allocator is a potentiometer.

9. The automatic high/low level alarm controller of claim 7, wherein said reference voltage is established by a voltage divider and said voltage comparator.

10. A method of using an automatic high/low level alarm controller, the method comprising:
    moving an activator having an associated permanent magnet, wherein said moving causes a magnetic switch to change state and automatically arm a high/low level alarm controller;
    receiving a signal indicative of fluid level within a tank having a level sending unit that is electrically coupled to said high/low level alarm controller, said high/low level alarm controller generates an alarm condition when said fluid level reaches a predetermined level set point amongst at least one level set point; and
    responsive to an occurrence of said alarm condition, acknowledging said alarm condition.

11. The method of claim 10, wherein said level alarm controller having a comparator, providing a shifting bias voltage to said comparator.

12. The method of claim 11, wherein said shifting bias voltage comprises a first bias voltage corresponding to an initial voltage set point and at least one second bias voltage corresponding to a subsequent voltage set point.

13. The method of claim 12, wherein said bias voltage derives from a voltage allocator, said voltage allocator being interposed between and receiving a primary voltage and an adjustable reference voltage, said Initial voltage set point being correlated to an initial reference voltage and said subsequent voltage set point being correlated to a subsequent reference voltage.

14. The method of claim 10, wherein said activation unit is a removable cap adapted to close access to a tank.

15. The method of claim 10, wherein acknowledging comprises moving said activation unit to cause said magnetic switch to change state and automatically disarm said high/low level alarm controller.

16. The method of claim 10, wherein acknowledging comprises activating an acknowledge switch to terminate the occurrence of said alarm condition.

17. The method of claim 10, wherein acknowledging comprises activating an acknowledge switch to suspend the occurrence of said alarm condition.

18. An alarm control unit for monitoring a variable condition, comprising:
    a comparator having first and second inputs and an output, said first input for receiving a voltage that varies, said second input for receiving a set point voltage, said output capable of toggling between low and high impedance states relative to comparison of voltage at said first and second inputs;
    a voltage allocator having first and second inputs and an output, said output being coupled to said second input of said comparator, said first input for receiving a supply voltage, and said second input being coupled to said output of said comparator; a voltage divider having an input and first and second outputs, said input being coupled to said first input of said allocator and said first output being coupled to said second input of said allocator; and
    a trigger having first and second inputs and an output, said first input being coupled to said first input of said allocator and said second input being coupled to said second output of said divider; and a relay having first and second inputs and an output said first input being coupled to said first input of said allocator, said second Input being coupled to said output of said trigger, and said output for driving an external network, wherein said voltage allocator is configured to establish an initial set point in response to receipt of said supply voltage arid a subsequent voltage set point in response to said comparator relative to said variable voltage.

19. The alarm control unit of claim 18, wherein said voltage allocator is a potentiometer.

20. The alarm control unit of claim 18 wherein said trigger is an optoisolator.

21. The alarm control unit of claim 18, wherein said voltage divider comprises a plurality of resistors.

22. The alarm control unit of claim 18, wherein said varying voltage is obtained from a level sending unit.

23. A marine craft comprising an automatic interlock controller and a power supply, said controller comprising:
   at least one magnetic switch having a common first end and common second end, said second end for receiving a reference voltage; an activator coupled to said magnetic switch;
   a trigger having first and second inputs and an output, said first input being coupled to said first end of said magnetic switch and said second input for receiving a source voltage; and
   a relay having first and second inputs and an output, said first input being coupled to said output of said trigger, said second input being coupled to said second input of said trigger, said output for driving an external network.

24. The marine craft of claim 23 having a power driven hatch-lift, wherein said controller controls available power to said hatch-lift.

25. The marine craft of claim 24 further having a transom door, wherein said magnetic switch is actuated by said transom door.

26. The marine craft of claim 25, wherein said magnetic switch diverts power to said trigger which then energizes said relay to disable power flow to said hatch-lift.

27. The marine craft of claim 25, wherein said magnetic switch is open when said transom door is open, energizing said relay and blocking power from flowing to said hatch-lift.

28. The marine craft of claim 25, wherein said magnetic switch diverts power from said trigger which then de-energizes said relay and enables power to flow to said hatch-lift.

29. The marine craft of claim 25, wherein said magnetic switch is closed when said transom door is closed, de-energizing said relay and enabling power to flow to said hatch-lift.

30. A kit for outfitting a tank installation having an automatic high/low level alarm controller with a fill neck access tube and access tube cap installation a magnetic switch, the kit comprising:
   a permanent magnet;and
   a housing having at least one magnetic switch capable of magnetically coupling with said permanent magnet; and
   an alarm control unit electrically coupled to said at least one magnetic switch and adapted to provide electrical output responsive to level within said tank,
   wherein said permanent magnet is attached to the access tube cap, and
   wherein said tank installation comprises:
   a tank;
   the fill neck access tube coupled to said tank; and
   an activation unit adapted to enable sealing said fill neck access tube.

31. The kit of claim 30, wherein said permanent magnet is adapted to removeably couple to said activation unit.

32. The kit claim of claim 31, wherein said permanent magnet is a ring magnet.

33. The kit of claim 30, wherein said housing is adapted to removeably couple to said fill neck.

34. The kit claim of 33, wherein said housing is a collar having a set screw.

35. A method of using the kit of claim 30, the method comprising:
   attaching said permanent magnet to said activation unit; securing said housing upon said fill neck; and
   coupling said housing to said alarm control unit.

36. The method of using the kit of claim 35, wherein said attaching is permanent.

* * * * *